United States Patent [19]

Fischer et al.

[11] 4,395,525

[45] Jul. 26, 1983

[54] HOT MELT ADHESIVES

[75] Inventors: Hannes Fischer, Taunusstein; Rolf Zimmermann, Wiesbaden, both of Fed. Rep. of Germany

[73] Assignee: Hoechst Aktiengesellschaft, Fed. Rep. of Germany

[21] Appl. No.: 194,013

[22] Filed: Oct. 6, 1980

[30] Foreign Application Priority Data

Oct. 6, 1979 [DE] Fed. Rep. of Germany ....... 2940649

[51] Int. Cl.$^3$ .................... C08F 220/06; C08F 220/56
[52] U.S. Cl. .................................. 526/307.6; 428/349
[58] Field of Search ...................... 526/303, 317, 307.6

[56] References Cited

U.S. PATENT DOCUMENTS

| | | | |
|---|---|---|---|
| 2,794,016 | 5/1957 | Glenn et al. | 526/303 |
| 2,892,821 | 6/1959 | Stewart et al. | 526/303 |
| 3,952,135 | 4/1976 | Priddle et al. | 526/317 |
| 4,181,752 | 1/1980 | Martens et al. | 526/317 |

*Primary Examiner*—Harry Wong, Jr.
*Attorney, Agent, or Firm*—Hammond & Littell, Weissenberger and Muserlian

[57] ABSTRACT

A hot melt adhesive having a good thermal stability under load, based on a copolymer of a predominant proportion of acrylates or methacrylates, a minor proportion of acrylic or methacrylic acid amides and further based on acrylic or methacrylic acid compounds, characterized in that the copolymer comprises (a) 85 to 95% by weight of alkyl acrylates and/or methacrylates with 1 to 12 carbon atoms in the alkyl radical, (b) 3 to 10% by weight of acrylamide and/or methacrylamide, (c) 0.2 to 5% by weight of one or more olefinically unsaturated mono- or dicarboxylic acids with up to 5 carbon atoms, the sum of components (a) to (c) amounting to 100%, at a and a process for preparing a multi-layer article, containing said adhesives.

7 Claims, No Drawings

HOT MELT ADHESIVES

The present invention relates to hot melt adhesives, especially hot melt pressure-sensitive adhesives.

In the adhesives industry hot melt adhesives offering toxicological and ecological advantages because of the lack of organic solvents therein have recently been used to an increasing extent instead of the hitherto conventional solvent-based adhesives. Synthetic resins which are to be used for hot melt adhesives must have good bond strength and shear strength; moreover, they must have a viscosity sufficiently low for manufacture and application, and have a substantially stable viscosity in the melted state in order to ensure satisfactory workability over a long period.

Hot melt adhesives based on copolymers of styrene and acrylates or methacrylates as well as optionally polar, hydrophilic, ethylenically unsaturated monomers are known. These products have good heat stability at 180° to 200° C., but they must have very high molecular weights in order to keep the cold flow low and to achieve good thermal stability when bonds are loaded. Owing to the high molecular weights they have very high viscosity and low tack, so that such products are not suitable as pressure-sensitive adhesives. If the molecular weight is lowered, in order to improve the workability and the tack, the shear strength and thermal stability under load are greatly diminished.

Adhesive strips having pressure-sensitive adhesives which contain synthetic resins of copolymers of acrylates and comonomers carrying polar groups, especially acrylic acids and optionally also amines and/or nitriles are also known. These solvent-based adhesives have good bond and shear strength, but very low thermal stability under load.

Similarly synthetic resins for hot melt adhesives include copolymers based on acrylates which contain acrylonitrile and acrylamide as polar comonomers. These products have good bond strength, shear strength and thermal stability under load. In order to achieve these advantageous properties, however, the viscosity must be very high, so that manufacture and working are complicated thereby. Moreover, the use of acrylonitrile as a comonomer is unfavourable, since acrylonitrile is a very toxic substance.

The object of the present invention is to provide a hot melt adhesive which does not have the disadvantages of the above-mentioned known adhesives.

The invention therefore provides a hot melt adhesive having a good thermal stability under load, based on copolymers of a predominant proportion of acrylates or methacrylates, a minor proportion of acrylic or methacrylic acid amides and further based on acrylic or methacrylic acid compounds, characterised in that the copolymers comprise (a) 85 to 95% by weight of one or more alkyl acrylates and/or methacrylates with 1 to 12 carbon atoms in the alkyl radical, (b) 3 to 10, preferably 4 to 8% by weight of acrylamide and/or methacrylamide, (c) 0.2 to 5, preferably 0.4 to 3% by weight of olefinically unsaturated mono- or dicarboxylic acids with up to 5 carbon atoms, the sum of components (a) to (c) amounting to 100% in every case. The alkyl radicals of component (a) can optionally be branched.

Since this hot melt adhesive is free of acrylonitrile, the preparation and working thereof are environmentally safe. Surprisingly, the hot melt adhesives according to the invention are distinguished not only by good bond strength and shear strength, but also by good thermal stability under load and sufficient viscosity stability at temperatures of about 180° C. Furthermore, they still have a low melt viscosity.

Appropriately, the hot melt adhesive which is preferably in the form of a hot melt pressure-sensitive adhesive, contains a component (a) which comprises (a1) at least one butyl acrylate, especially n-butyl acrylate, (a2) at least one $C_{6-12}$ alkyl acrylate and (a3) methyl methacrylate.

The mutual weight ratio of components (a1) to (a2) to (a3) is advantageously (15 to 35):(55 to 85):(5 to 15), preferably (20 to 30):(60 to 75):(7 to 12), the sum always amounting to 100%. Other monomers which may be used include e.g. methyl, hexyl, and octyl acrylates, such as 2-ethylhexyl acrylate or the like.

The consistency of the copolymers of course depends on the composition of the monomer mixture. The higher the selected proportion of monomers whose polymers have a low glass-transition temperature, the softer the copolymers become. If the proportion of methyl methacrylate is increased, harder copolymers are obtained. If methyl methacrylate were replaced by styrene or vinyl toluene, products with a high glass-transistion temperature would be obtained, as in the case of methyl methacrylate homopolymers. This measure would have the further disadvantage that the heat resistance of the copolymers would be worsened, so that such products are not suitable in practice.

Examples of carboxylic acid components (c) include crotonic acid, itaconic acid, maleic acid, fumaric acid and the like, but preferably acrylic and/or methacrylic acid. If the carboxylic acid concentration is increased, the viscosity and thermal stability under load of the polymer rise, whereas the surface tack is reduced.

The copolymers of the hot melt adhesives according to the invention are light-coloured, transparent and very strongly tacky masses. They produce melts which are of low viscosity at the conventional working temperature of 180° C. and whose melt viscosity at this temperature remains virtually unchanged for more than 24 hours. The melt viscosity generally amounts to at most 80, preferably at most 77, especially at most 55 Pa.s/180° C. The minimum melt viscosity is e.g. 20, preferably 30, especially 35 Pa.s/180° C. In many, but less preferred cases the minimum melt viscosity may also be below 20 Pa.s. It is thus considerably lower than that of known hot melt pressure-sensitive adhesive resins which have a comparable thermal stability under load.

Owing to their low melt viscosity the copolymers of the hot melt adhesives according to the invention can be worked in a simple way at temperatures around 180° C. They are especially suitable as pressure-sensitive adhesives for metal, paper, cardboard, plastic films, plastic panels, ceramics and similar materials. In any case, they may be used alone or optionally in combination with addition resins conventional in the adhesives industry, for example terpene phenol resins, polyterpene resins, hydrocarbon resins, e.g. those based on indene or dicyclopentadiene, or hydrogenated hydrocarbon resins and/or fillers such as barytes, chalk, talc, titanium dioxide or quartz powder.

The copolymerisation of components (a), (b) and (c) may be effected in solution or by substance polymerisation, in the presence of polymerisation initiators and optionally also of chain controllers.

Examples of polymerisation initiators which may be used include, above all, peroxides such as di-tert.-butyl peroxide, lauryl peroxide, di-cumyl peroxide, cumene hydroperoxide, tert.-butyl hydroperoxide, tert.-butyl perbenzoate, tert.-butyl peroctoate, dibenzoyl peroxide, methylethylketone peroxide either, individually or in mixture, or azoisobutyric acid dinitrile in amounts of 0.3 to 3, preferably 0.3 to 1 percent by weight, referred to components (a) to (c).

The polymerisation may be effected batchwise or by gradual portionwise addition of the starting materials. In the last-mentioned case block or graft polymers may be obtained with portionwise addition. Especially favourable results are achieved with batchwise copolymerisation in the presence of solvents. In the preparation of hot melt pressure-sensitive adhesives according to the invention the solvents are generally removed, when polymerisation is complete, by distillation at elevated temperature, that is up to about 200° C., optionally under reduced pressure.

Solvents which may be used include e.g. aromatic hydrocarbons such as toluene and xylene and mixtures thereof with saturated hydrocarbons such as cyclohexane or petrol fractions and/or optionally alcohols. Since some solvents, for example aromatic hydrocarbons or alcohols, can have a chain-breaking effect, the molecular weight or the viscosity of the copolymers and consequently of the hot melt pressure-sensitive adhesives can be influenced by the choice of the solvent mixture used.

The invention is illustrated by the following Examples, in which T represents parts by weight and % represents percent by weight. The acid number (AN) was determined in every case according to DIN 53402.

EXAMPLES

I. Preparation of the copolymers (1) A mixture of 1 T of acrylic acid, 6 T of acrylamide, 9 T of methyl methacrylate, 60 T of 2-ethylhexyl acrylate and 23 T of butyl acrylate is copolymerised in a mixture of toluene, cyclohexane and isobutanol with the use of 0.5 T of di-tert.-butyl peroxide at 100° to 130° C. The solvent mixture is removed by distillation at 180° to 190° C. under reduced pressure (<50 mbars). The yield of polymer is more than 99%. The final product obtained has a melt viscosity of 45 Pa.s at 180° C. and an AN of 6. The glass transition temperature is −45° C.

(2) The polymerisation described in Example 1 is repeated with the addition of 1% n-dodecyl mercaptan as a molecular weight controller. The copolymer obtained has a melt viscosity of 25 Pa.s at 180° C., an AN of 6 and a glass transition temperature of −47° C.

(3) A 75% solution of a monomer mixture of 1 T of acrylic acid, 4.5 T of acrylamide, 8.5 T of methyl methacrylate, 63 T of 2-ethylhexyl acrylate and 21 T of butyl acrylate in a mixture of toluene, cyclohexane and isobutanol is copolymerised at 110° to 130° C. in the way described in Example 1 and the solvent is subsequently removed by distillation, finally under reduced pressure. The copolymer obtained has a melt viscosity of 21 Pa.s at 180° C., an AN of 6, and a glass transition temperature of −50° C.

(4) A 70% solution of a monomer mixture consisting of 0.9 T of acrylic acid, 6.8 T of acrylamide, 70 T of 2-ethylhexyl acrylate and 23 T of butyl acrylate in a mixture of toluene, a petroleum fraction boiling in the range 80° to 110° C. and isobutanol is copolymerised in the way described in Example 1. The solvent is removed from the batch by distillation, as specified in Example 1. The final product has a melt viscosity of 39 Pa.s at 180° C. and an AN of 6.

(5) Acccording to the process described in Example 1, 0.5 T of acrylic acid, 6 T of acrylamide, 9 T of methyl methacrylate, 60 T of 2-ethylhexyl acrylate and 25 T of butyl acrylate are copolymerised. After treatment, a copolymer is obtained in a yield of over 98% calculated on the monomers used and has a melt viscosity of 40 Pa.s at 180° C., AN 3, and a glass transition temperature of −42° C.

(6) In the way described in Example 1, 2.9 T of acrylic acid, 5.8 T of acrylamide, 8 T of methyl methacrylate, 62 T of 2-ethylhexyl acrylate and 21 T of butyl acrylate are copolymerised. After separation of the solvent the yield of polymer relative to the monomers used is over 98%. The viscous synthetic resin obtained has a melt viscosity of 34 Pa.s at 180° C. The glass transition temperature is −43° C., and the AN 17.7.

(7) In the way described in Example 1, 1 T of methacrylic acid, 6 T of acrylamide, 8 T of methyl methacrylate, 65 T of 2-ethylhexyl acrylate and 21 T of butyl acrylate are copolymerised. The yield relative to the monomers used is 98%. The final product obtained with this composition has a melt viscosity of 32 Pa.s at 180° C., an AN of 5 and a glass transition temperature of −47° C.

(8) According to the process described in Example 1, 1 T of acrylic acid, 6 T of acrylamide, 5 T of ethyl methacrylate, 70 T of lauryl methacrylate and 18 T of n-butyl acrylate are copolymerised. The yield of polymer relative to the monomers used is over 98%. The synthetic resin obtained has a melt viscosity of 45 Pa.s at 180° C., a glass transition temperature of −46° C., and an AN of 6.

(9) In the way described in Example 1 , 0.9 T of acrylic acid, 6.3 T of acrylamide, 60 T of 2-ethylhexyl acrylate and 32 T of butyl acrylate are polymerised. The yield relative to the monomers used is 99%. The synthetic resin obtained has a melt viscosity of 41 Pa.s at 180° C., and an AN of 7.

II. Physical test

The copolymers prepared according to Examples 1 to 9 are subjected to practical tests as hot melt pressure-sensitive adhesives. In so doing, the following properties were tested, which, as mentioned above, are especially important for hot melt pressure-sensitive adhesives:

(a) bond strength,
(b) shear strength,
(c) tack,
(d) inclination to flow, and
(e) thermal stability.

The results obtained in these tests are shown in the Table below. The measurements were carried out and assessed as follows:

(a) Bond strength:

The bond strength is determined by rolling a polyethylene terephthalate film strip provided with 25 gm$^{-2}$ of the adhesive resin to be tested onto chrome-nickel steel (V2A) and by detaching it again after 5 minutes. The force required to detach the film is measured and should amount to more than 3 N/cm for a good hot melt pressure-sensitive adhesive.

(b) Shear strength:

To determine the shear strength, a polyethylene terephthalate film coated with 25 gm$^{-2}$ of the adhesive resin to be tested is applied to chrome-nickel steel and loaded statically with a weight of 600 g. per cm$^{-2}$ of adhesive surface. The shear strength is specified as the time after which the film is detached from the substrate under the load weight. Times of at least 300 minutes are required for hot melt pressure-sensitive adhesives corresponding to the state of the art.

(c) Tack:

The tack is determined by the rolling-ball method in which the stopping distance of a defined ball on a polyethylene terephthalate film strip coated with the adhesive resin to be tested is measured. The value is given in cm and it should not substantially exceed 20 cm for hot melt pressure-sensitive adhesives. Upward deviations are acceptable when the adhesive shows a very good shear strength.

(d) Inclination to flow:

To determine the inclination to flow, a spherical sample of the adhesive resin to be tested weighing 5 g is placed on a glass plate. The plate with sample attached is put into a warming cabinet for 30 minutes at 70° C. at an angle of 105°. Subsequently, the distance which the sample covers on the plate in this time is measured. The value is given in cm; it should not exceed 5 cm for adhesive resins corresponding to the state of the art.

(e) Thermal stability:

To determine the thermal stability, a sample of the adhesive resin to be tested weighing about 150 g, which contains 0.1% of an anti-ageing agent, for example a commercial product in the form of a phenol ether derivative, is stored for 24 hours at 180° C. in a drying cabinet. The resin melt should be capable of flow and free of gelled fractions after this time. The change of viscosity in relation to the starting value should not exceed 20% calculated on the starting value for hot melt adhesive resins corresponding to the state of the art.

The test results are shown in the following Table.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A hot melt adhesive having a good heat stability comprising a copolymer of
   (a) from 85 to 95% by weight of an alkylester of at least one carboxylic acid selected from the group consisting of acrylic and methacrylic acid each having 1 to 12 carbon atoms in the alkyl radical,
   (b) from 3 to 10% by weight of at least one acrylic or methacrylic amide or mixture thereof,
   (c) from 0.2 to 3% by weight of at least one olefinically unsaturated carboxylic acid having at most 2 carboxylic groups and having up to 5 carbon atoms wherein the total of the percentages is always 100 and wherein the copolymer has a melt viscosity of 20 to 80 Pa.s/180° C.

2. An adhesive as claimed in claim 1 in which component (a) consists of (a1) at least one butylacrylate, (a2) at least one alkylacrylate having from 6 to 12 carbon atoms in the alkyl radical and (a3) methylmethacrylate.

3. An adhesive as claimed in claim 2, wherein the weight ratio of component (a1):(a2):(a3) is in the range from (15 to 35):(55 to 85):(5 to 15), wherein the total is always 100.

4. An adhesive as claimed in claim 3, wherein the weight ratio of component (a1):(a2):(a3) is in the range from (20 to 30):(60 to 75):(7 to 12).

5. An adhesive as claimed in claim 1, wherein the copolymer has a melt viscosity of at most 55 Pa.s/180° C.

6. An adhesive as claimed in claim 1 in the form of an adhering hot melt adhesive.

7. An adhesive of claim 1 wherein the olefinically unsaturated carboxylic acid component (c) of the copolymer is a member selected from the group consisting of acrylic acid, methacrylic acid and mixtures thereof.

* * * * *

| Adhesive resins according to Example | Physical properties of hot melt adhesives | | | | | | | | |
|---|---|---|---|---|---|---|---|---|---|
| | 1 | 2 | 3 | 4 | 5 | 6 | 7 | 8 | 9 |
| Bond strength in N/cm | 3.2 | 3 | 3.5 | 4.5 | 3.1 | 3 | 3.1 | 3.7 | 4.8 |
| Shear strength in min. | 420 | 320 | 300 | 305 | 315 | >1400 | 420 | 310 | 300 |
| Rolling-ball tack in cm | 20 | 15 | 5 | 20 | 20 | 21 | 23 | 17 | 20 |
| Inclination to flow in cm | 1.4 | 1.7 | 3.9 | 1.9 | 1.7 | 1.3 | 1.2 | 2.3 | 1.6 |
| Thermal stability 24 h/180° C. | in order | in order | in order | in order | in order | in order | in order | in order | in order |